(12) United States Patent
Duroux

(10) Patent No.: US 8,162,491 B2
(45) Date of Patent: Apr. 24, 2012

(54) PLASTIC GLASS MIRROR FOR VEHICLES

(75) Inventor: Bernard Duroux, Garancieres (FR)

(73) Assignee: SMR Patents S.a.r.l., Luxembourg (LU)

( * ) Notice: Subject to any disclaimer, the term of this patent is extended or adjusted under 35 U.S.C. 154(b) by 425 days.

(21) Appl. No.: 12/428,127

(22) Filed: Apr. 22, 2009

(65) Prior Publication Data
US 2009/0268293 A1   Oct. 29, 2009

(30) Foreign Application Priority Data

Apr. 23, 2008 (EP) ................................. 08155042

(51) Int. Cl.
*G02B 7/18* (2006.01)
(52) U.S. Cl. ........................................... 359/512
(58) Field of Classification Search ............. 359/512, 359/871, 872, 877
See application file for complete search history.

(56) References Cited

U.S. PATENT DOCUMENTS

| 5,566,031 | A  | * | 10/1996 | Meyr et al. ................ 359/883 |
| 7,408,694 | B2 | * | 8/2008 | Busscher et al. ............ 359/265 |
| 2002/0141085 | A1 | | 10/2002 | Whitehead et al. |
| 2003/0223136 | A1 | | 12/2003 | Bade et al. |
| 2004/0264011 | A1 | | 12/2004 | Lynam |

FOREIGN PATENT DOCUMENTS

| EP | 0677434 | 10/1995 |
| EP | 1186473 | 9/2001 |
| WO | 03004245 | 1/2003 |

OTHER PUBLICATIONS

European Search Report for EP 08155042 dated Dec. 2, 2008.

* cited by examiner

*Primary Examiner* — Euncha Cherry
(74) *Attorney, Agent, or Firm* — Reising Ethington P.C.

(57) ABSTRACT

The invention related to a rear view mirror using a plastic glass material to combine several functions as fixing and heating.

7 Claims, 7 Drawing Sheets

Fig. 3

PLASTIC GLASS MIRROR FOR VEHICLES

BACKGROUND OF THE INVENTION

The invention is based on a priority patent application EP 08155042.8, which is hereby incorporated by reference.

The present invention relates to a mirror device, in particular for automotive vehicle outer rearview mirror formed by a plastic material.

STATE OF THE ART

Plastic glass is known in prior art to replace normal silica glasses. For example in EP1412158 a method is disclosed that allows producing plastic glass in a high quality. Typical plastics include optical grade injection mouldable material, optical grade polycarbonates, methacrylates or methacrylate modified polycarbonates. Suitable materials are obtainable from General Electric, for instance, plastics sold under the trade designations MAKROLON 2207 and LEXAN LSI are particularly suitable in processes. Also, it is necessary to provide optical quality polished mould surfaces to maintain the optical properties of the finished part.

Figure 1:
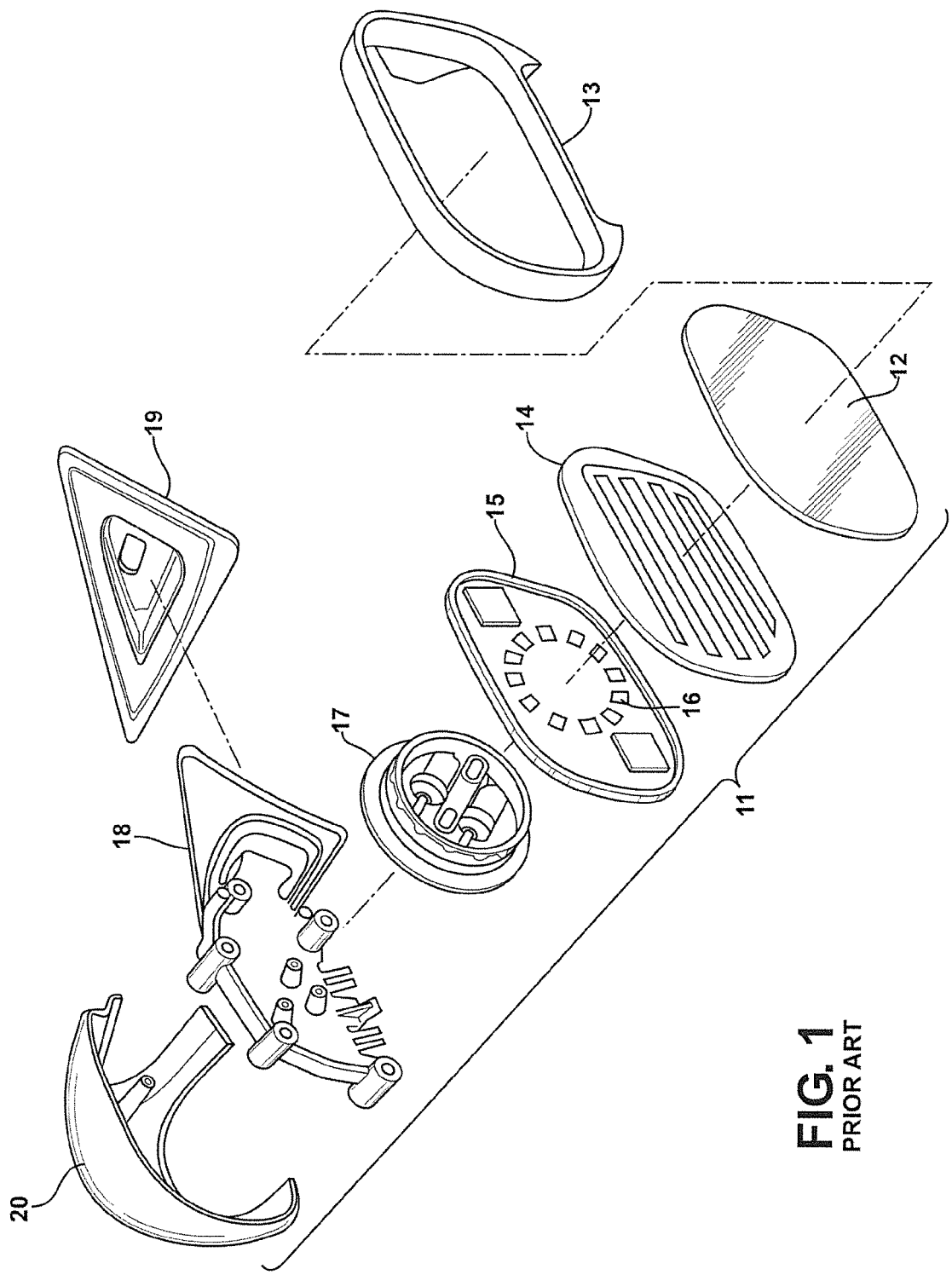

A conventional rear view mirror for a vehicle comprises as schematically shown in FIG. 1 separate parts for heating of the mirror glass and for fixing the mirror glass on a backing plate. It is also known in prior art that the heating device is not a separate part as a heating foil but directly layered on the mirror glass. For example the heating circuits of conventional mirror bodies of outer rearview mirrors for automotive vehicles are achieved by depositing resistive ink on a Mylar layer. Said deposition is generally obtained by screen printing. Specifically, the heating circuit is typically obtained by depositing a metal alloy on the back face of the mirror.

In the EP 0677434 a solution is proposed that heats the mirror with a resistive metal layer. This layer is sputtered on the mirror glass and contacted by electrodes separated by isolating layer in between. The electrodes are connected at one side of the mirror, a solution that uses a two-way connector for the power supply of the circuit and thus eases the associated electric bundle.

EP1186473 discloses a plastic substrate for a mirror. The plastic glass mirror is fixed to the rear view mirror housing by fixing means.

SUMMARY OF THE INVENTION

It is the objective of the invention to ease a rear view mirror for a vehicle by combining parts and to optimize the use of a plastic glass replacing a silica glass.

In automotive use plastic glass is advantageous for the weight of the glass is much lower than the weight of silica glass.

Especially the fact that plastic glass does not split reduce injury risk of passengers and pedestrians. Another advantage of the plastic glass is that all fixation means are produced in one moulding step and the use of a conventional backing plate is avoided.

Another advantage is that the light weighting material of plastic glass allows the use of heating means with an additional thin metal layer.

The very good accuracy of the radius different to mineral mirrors allows reducing the volume of the mirror and the needed material.

It is an object of the present invention to provide a mirror for automotive vehicle rearview mirror having an electric circuit capable of permitting to maintain an acceptable and better distributed current density, while optimizing and simplifying the construction of said circuit.

SHORT DESCRIPTION OF THE DRAWINGS

Figure 2:
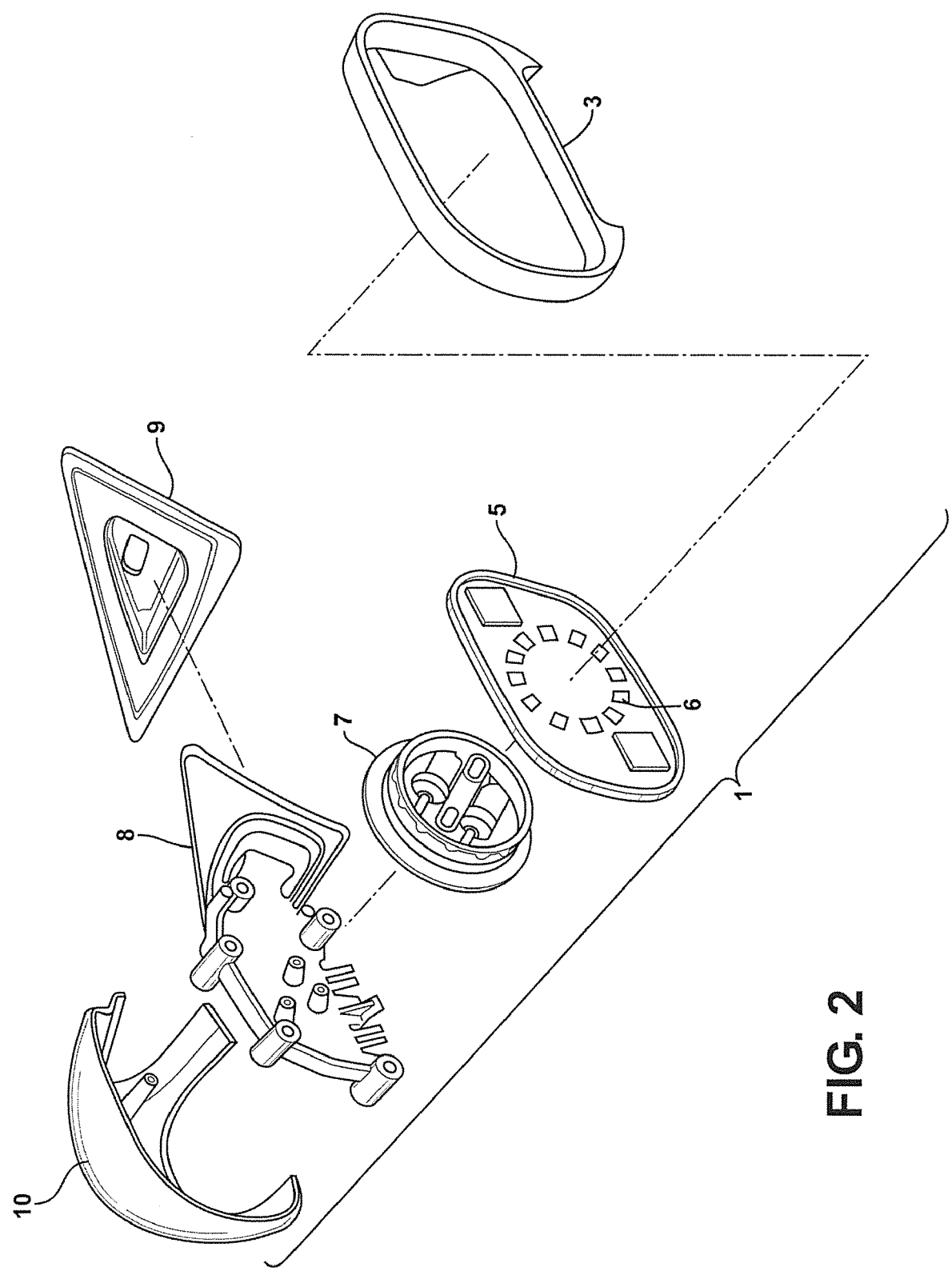
Figure 4:
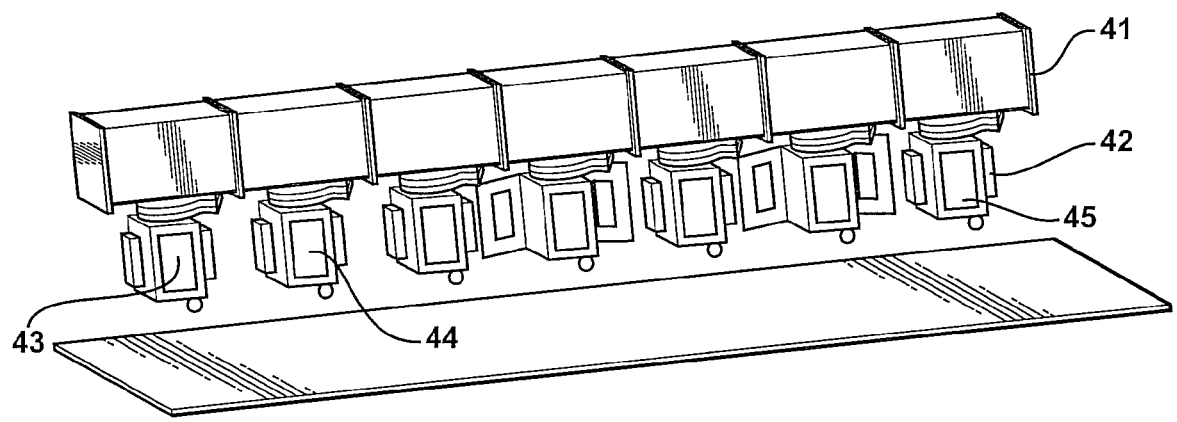
Figure 7:
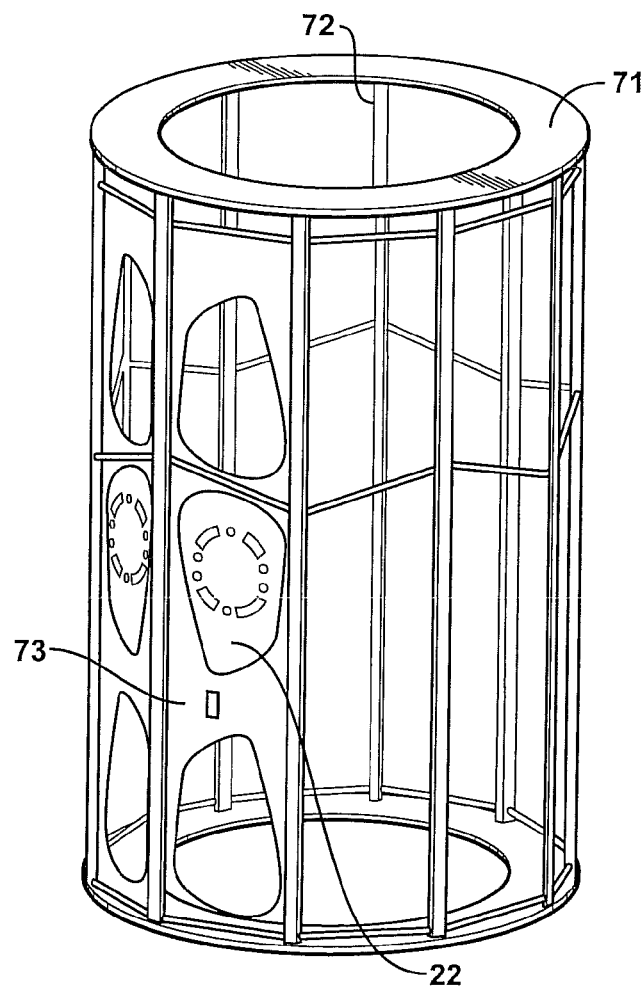
Figure 5:
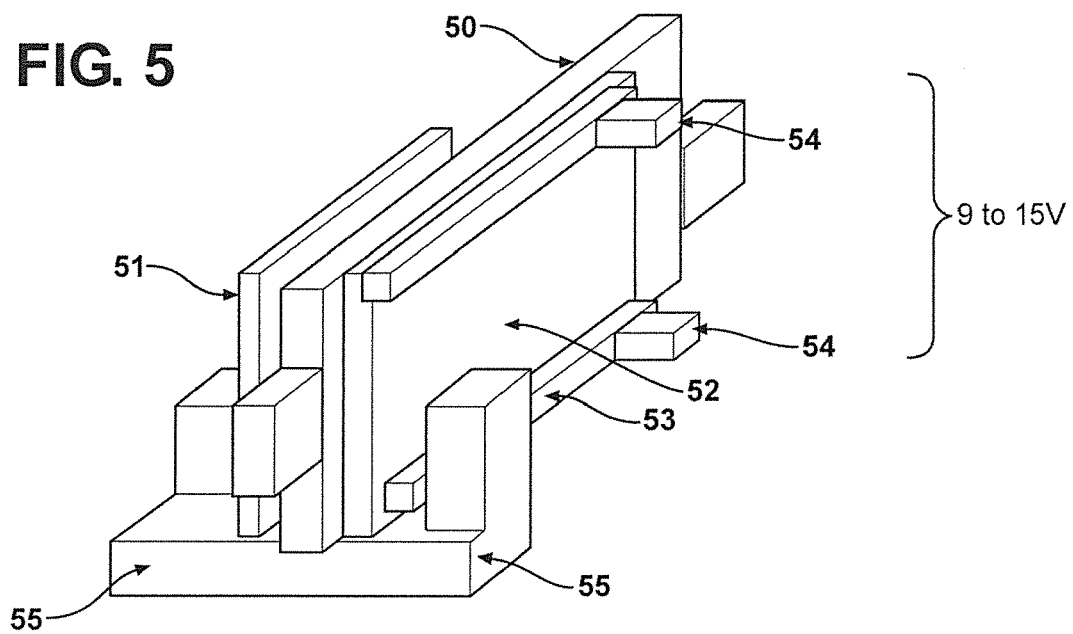
Figure 6:
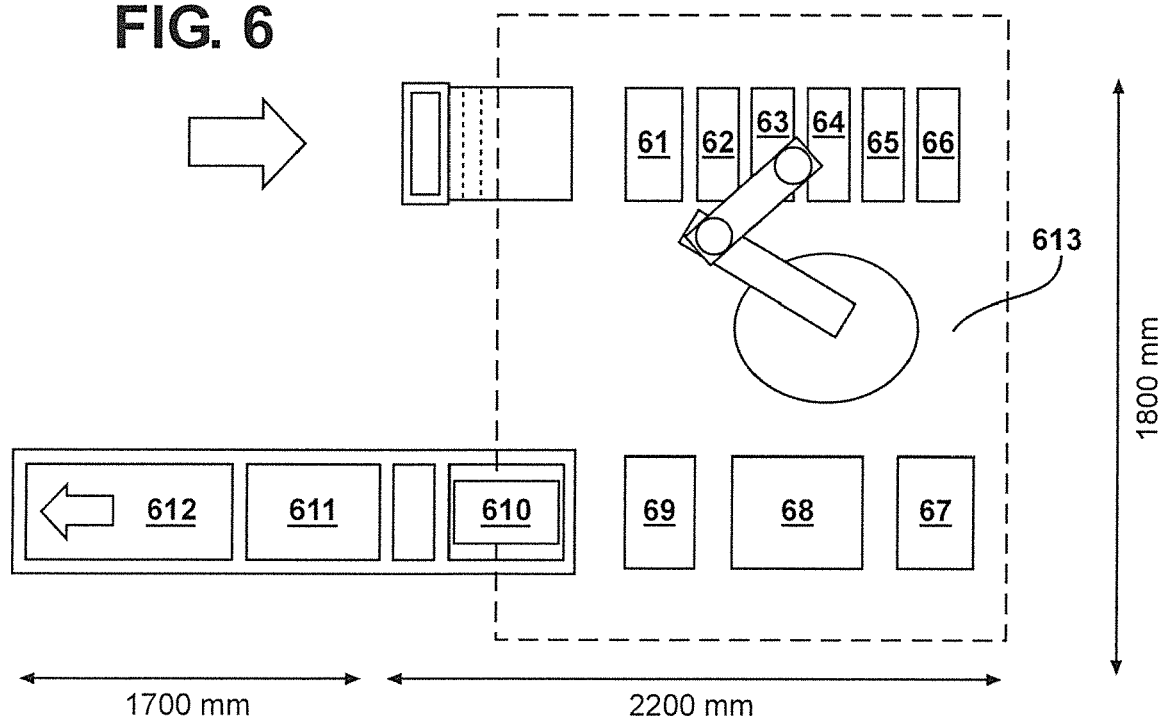
Figure 8:
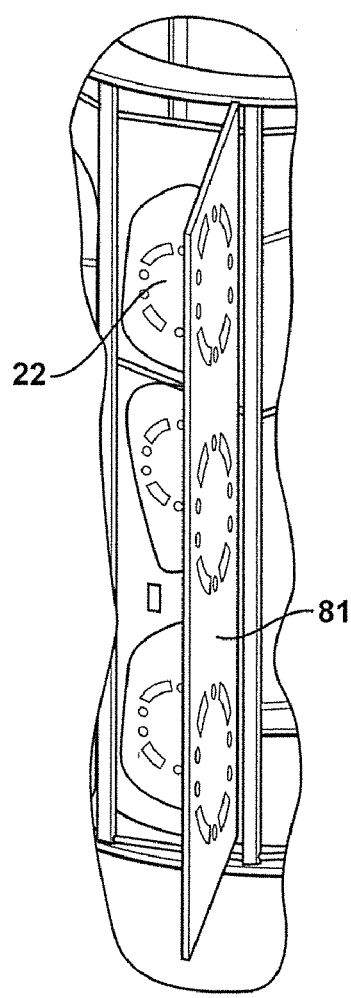
Figure 9:
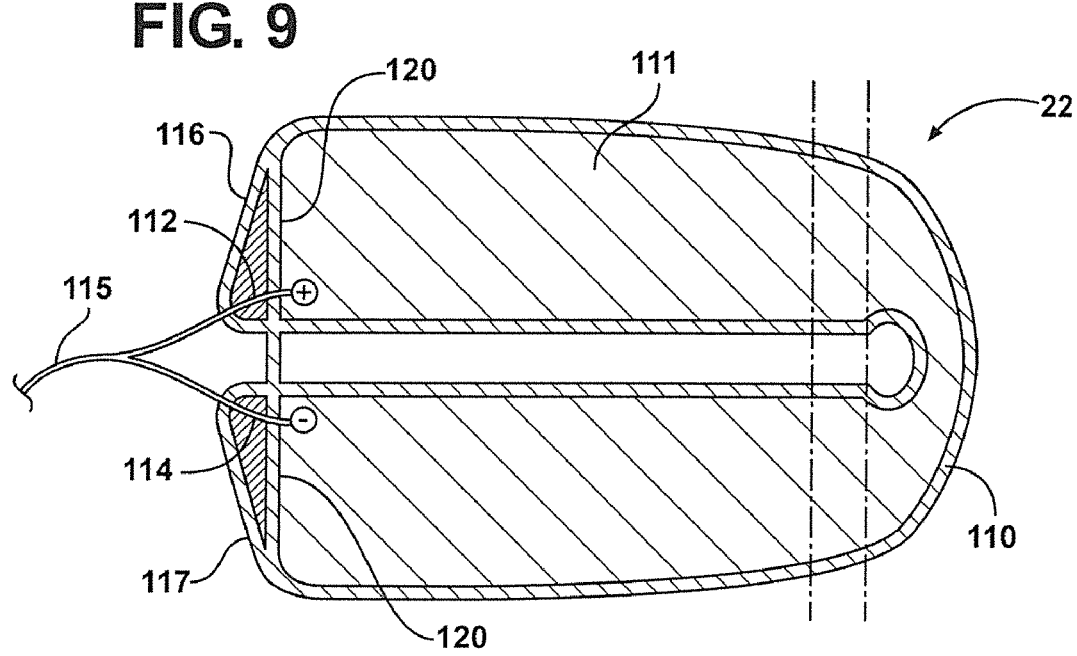
Figure 10:
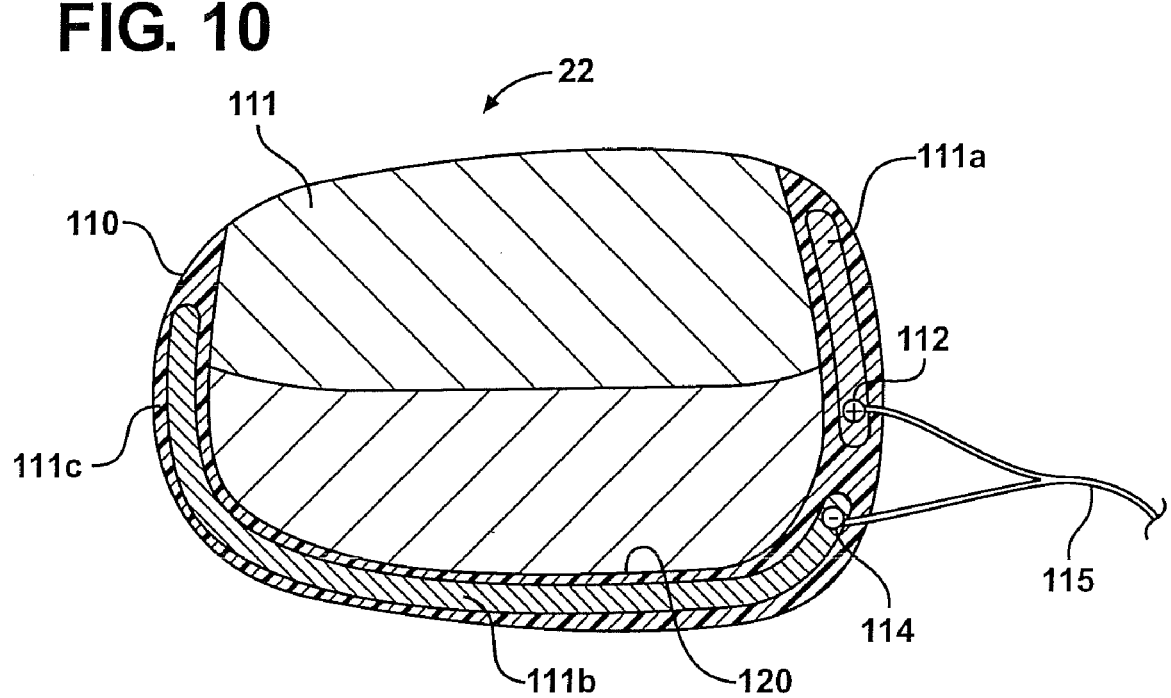
Figure 11:
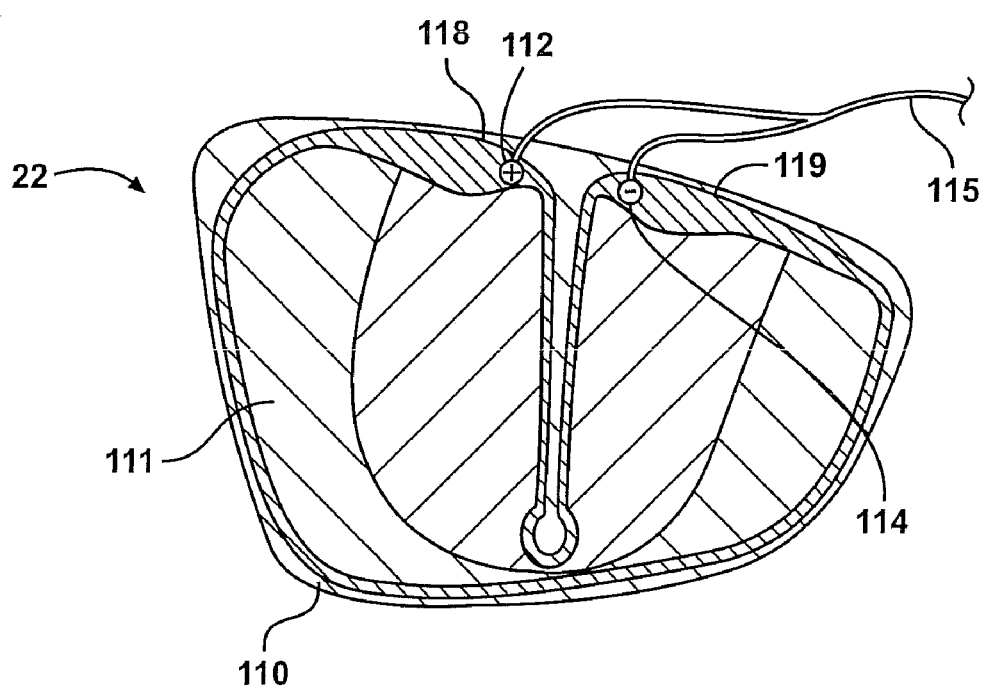

FIG. 1 is a schema of a mirror construction in prior art
FIG. 2 is a solution according the invention
FIG. 3 is a schema for the process to produce a plastic glass for the invention
FIG. 4 is part of the process in FIG. 3
FIG. 5 shows the schematic plastic glass structure
FIG. 6 shows a part of the process of FIG. 3
FIG. 7 shows a device for the process
FIG. 8 shows the device of FIG. 7 with a mask
FIGS. 9-11 show examples of the heater solution.

DETAILED DESCRIPTION OF THE DRAWINGS

FIG. 1 shows a typical design of a rear view mirror 11. The mirror housing is built by a cover member 20, an internal housing part 18 and a bezel member 13. The housing is connected to a bracket part 19 and fixed at the vehicles contour. The reflective element is installed in the housing. A mirror glass 12 is attached to a heating device 14. This heating device is normally a foil comprising heating wires and prepared to be glued either on the mirror glass 12 or on the backing plate 15. The heating element foil has normally a second objective to protect the mirror to split. The backing plate 15 is a moulded plastic element that is prepared to support the mirror 12 and to fix the glass and the heater on top of a motor actuator 17. The motor actuator for the adaptation of mirror view is fixed by clips 16 on the backing plate 15.

FIG. 2 shows a schematic view of a rear view mirror 1 with a housing 10 and 8 and 3. In the housing a plastic mirror 22 is installed. The plastic mirror 22 is produced with the clips 6 used to connect the mirror to the actuator 7. The heating layer is directly deposited to the plastic material.

A rear view mirror according this inventional structure does replace backing plate, heating foil and glass mirror by a single coated plastic glass mirror.

Figure 3:
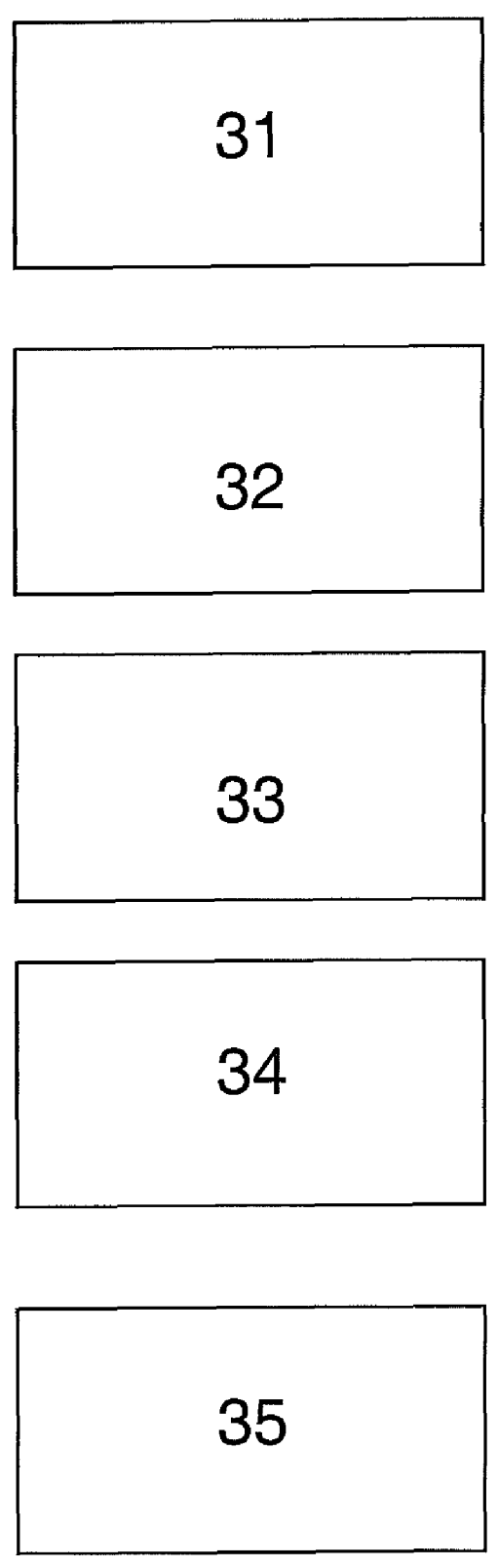

FIG. 3 describes the schematic process to produce a plastic glass mirror. The fist step 31 of moulding the plastic glass is described on prior art EP1412158. The plastic glass is moulded with a first surface with optical quality and a second surface that comprises the clips for the actuator and the ribs and taps for contacting the heater.

Plastic mirror fixing clips are optimised for several glass drive actuators 7. For some designs additional springs are used. This means that the fixing clips and spring positions must be optimized for each type of glass actuator. If the pressure onto the fixing clips is too high, it is possible, that visible distortion occurs onto the mirror surface. If the pressure is too low or if slackness of the glass drive rim exists between the spring and the clip, the plastic glass mirror and the resulting image will vibrate.

In the rim area of the moulded plastic mirror a distortion occurred due to cooling effects caused by the temperature difference between the mould (110° C.) and the injected plastic material (280° C.).

This difference leads to a rapid cooling of the thin (2 mm-3 mm) plastic mirror and thus to an area with decreasing thickness within 3 to 4 mm from the rim around the plastic mirror shape.

To solve the problem, a frame structure in the moulding tool is added to the rear rim surface. This resulted into a higher volume of hot plastic material in this area during injection, which cools down more slowly.

With a 1.5 mm frame the distortion can be eliminated. One preferred embodiment uses a frame structure thickness has been extended from 1.5 mm to a width of 2.2 mm.

An additional technical challenge is to avoid distortion on the plastic glass surfaces originated by ejection pins. A distortion occurred in the mirror image at areas, where the ejection pins are located to eject the part out of the mould. To overcome these problems the diameter of the ejection pins must have a minimum diameter size of around 12 mm.

In the moulding step 31 also the contact noses for the heater contacts are moulded. The noses or ribs are designed in a way they can be easily contacted with a plug and do not break during the process. The design of the contact can be done in any way a person skilled in the art would do.

The plastic glass substrates are cleaned and controlled after the moulding step 31. Additional ultra sonic activation step, an IR heating step and a final drying step can be done if necessary.

After the step 31 of moulding the plastic glass substrate undergoes the metallization steps to apply the reflective layer and for the heated mirror the electrical resistive layer.

FIG. 4 shows schematically a metallization process line 41. The plastic glass substrates are fixed in a support drum with the first optical "flat" surface without any rib, clip, etc at the inside diameter of the drum. The whole line works in a batch mode. In the first process station 43 the support drum with the mirror substrates is loaded. In the following stations plasma for a plasma vapour deposition process 44 is activated and the layers are applied. The metallization of the reflective layer is an AL Ti layer with a reflectivity of around 60%.

The next metallization steps are described later on for they are only necessary if a heater is required. The mirrors are unloaded in station 45. After the metallization line the next steps 33 and 34 are the hard coating of the mirror.

The hard coating process is first a flow coating process and than a spray coating process. The plastic glass is ready after the last step 35 which is a healing process.

FIG. 6 shows a schematic class 100 clean room with the steps to apply hard coating on the surfaces of the metallised mirror.

The mirrors are supplied to the automatic line. After an ultrasonic cleaning 61, the mirrors are rinsed in water also under ultrasonic waves 62. In the next step 63 demineralised water and ultrasonic waves are used to finalize the cleaning steps. In Step 64 the mirrors are dried in infrared drying step and cooled down in step 65. Step 66 comprises a dipping in a bath of hard coating material. The material is in a preferred embodiment Silicone Hard Coat SHC 5020 GE Bayer. The material is solved in Isobutanol. The material is specified to be used on cast or moulded plastic articles. The silicon hard coating does not need a primer and has a good clarity.

Another material for the hard coating is GE587B with a good adhesion on the plastic material but also on the alloy. The material can be used in dip and spray coating processes.

The $1^{st}$ layer of hard coat has a thickness of ~4 $\mu$m to 5 $\mu$m. The surface of the first dipped hard coat layer is very smooth. The roughness is much smaller than wavelengths of visible light. Therefore a defined reflexion is possible. This would lead to interference colours, especially with monochromatic light.

The dip coating results in a homogenous film of 4-5 micrometer under the condition the mirrors are extracted by a constant extraction speed from 3 to 5 mm/s. To finalize the hard coating an additional spraying step 68 must be applied. This is necessary for the mirror would show effects by interfering rays and diffraction phenomenon. To eliminate interference, a second and a third hard coat application step could be required.

The flash off time before spaying is in area of 10-40 s.

This second and third hard coat layer is sprayed by maintaining of temperature, drop size, viscosity and further parameters. As a result, the surface has a defined roughness that reduces interference by reflecting the light to different directions. This second layer has a thickness of 2 $\mu$m to 3 $\mu$m.

To avoid all negative effects a hard coat layer thickness of 6-10 $\mu$m is required The resulting surface resolves the interference problem.

The spray out speed is in area 100-200 mm/s.

The plastic mirror is cured in a oven at around 130 degree Celsius for 30 to 45 minutes.

The mirrors are than exported from clean room for further use.

Using the hard coat results that the image on the mirror shows distortion in the rim area. The width of the distortion is up to 5 mm. The reason is the surface tension of the liquid hard coat material, which leads to an increase of thickness at the end/rim of the surface (edge effect).

To eliminate the problem adaptation of the hard coat's surface energy to that of the mirror's surface could be done. One way to overcome the problem is to increase the edge radius along the rim of the mirror shape to an value of the edge radius of more than 0.6 mm One of these layers could be used a coloured hard coat in order to simulate interferential mineral mirror.

FIG. 5 shows a schematic plastic glass mirror with all layers. The plastic glass material 50 is coated at the first surface by metal layer TiAl as reflective layer. On the second surface the heating metallization 52 is coated. The heating layer 52 is contacted by electrodes 53 via pins 54. The whole structure is overlaid by a hard coating layer 55.

For plastic mirror that should be heated for de-icing the metallization process is amended by several steps. In FIG. 7 a sketched example of a transport support is described. A support drum 71 includes bars 72 as support to fix mirror substrate and mirror PVD templates 73 The mirrors are installed and fixed in the template 73 in a way that the reflective mirror layer is facing inwards and the surface of the substrate including the clips and contact structures are facing outwardly of the drum. The template or holder 73 has a structure so that the metal layers of the reflecting surface and the metal layer of the heating surface are separated by a defined leak. After the metallization of the reflecting layer with Al Ti, another target is used outside the drum to metallize the heating laying. The same alloy Al—Ti in percentage can be used for the both side. The resistance of the alloy is with less than 100 micro Ohm cm very low. The thickness of an optimal heating alloy layer could support the heating so that enough current could flow. But the thickness is limited by the adhesion of the layer on the plastic material. In a preferred embodiment the thickness of the alloy layer is between 0.07 to 0.09 micrometer.

In a next process step a template as seen in FIG. 8 covers the surface of the coated surface. Only the spaces the electrodes and the contacts are free. The electrodes are deposited in a next PVD process step using Cu as conductive drain.

In order to get the best homogeneity of the current lines two separated copper bus bars are deposited in a structure as explained in the examples of FIGS. 9 to 11.

For adaptation of contact positions to current series contact alignment, the design of the heating layer needs to be optimized.

The location of the contacts is targeted to be at the car's side of the mirror shape, both "+" and "−" on the same side.

Tests showed, that heater design with the shape of an "U" will cause a high current at the turn area of the U. Since current density is oriented along the lowest resistance between the contacts/drains, the highest value occurs at the inner radius of the U-turn, where the shortest distance between the contact areas exists. Therefore the risk of a burn through or a hot-spot preferably exists in that region. A bigger radius would solve the hot spot issue, but could cause a big non heated gap. Heater U-design requires a 4× higher thickness of the layer, due to longer distance between "+" and "−". Increasing the thickness of the heater layer is not feasible because the deposition rate is too low and the batch time would increase by factor 4. The adhesion between the plastic substrate and the NiTi heater alloy and also between the copper drain bar and the NiTi heater alloy will decrease.

FIG. 9 shows a mirror device 22 for an automotive vehicle outer rearview mirror (not shown) equipped with a defrosting function. Said device 22 comprises a substrate 110 of plastic material which is substantially plane or slightly curved for improved viewing angle. The external surface of substrate 110 is reflecting in a mirror-like manner and covers a thin heating resistive layer 111 of heat conducting alloy, for example nickel- and titanium-based. The resistive layer 111 is connected to a copper-made supply circuit comprising two electrodes 112 and 114 forming "+" and "−" connection points, respectively. Said electrodes 112 and 114 are connected through a two-way connector 115 to an external power supply (not shown), the current of which comes for example from the battery of the vehicle. The electrodes are locally insulated from the heating resistive layer 111 through an insulating material 120.

According to this embodiment, the heating resistive layer 111 is in the form of an elongated C with flattened legs, the ends 116 and 117 of said legs being in the immediate vicinity of each other and carrying electrodes 112 and 114, respectively. Thus, it is possible to connect the electrodes to a two-way electric bundle 115, which is much simpler to install than the prior art bundles. Moreover, the current intensity is well distributed to preserve the circuit reliability. Specifically, this allows maintaining a current density in the curved portion which is higher than that of the straight portion but lower than that of the connection electrodes.

FIG. 10 shows an alternative embodiment, wherein the heating resistive layer 110 occupies substantially the entire surface of the substrate 110, except for two thin peripheral strips defining the two electrodes 112 and 114. Specifically, a first strip 112 extends along one lateral edge 111a of the heating resistive layer 111 so as to form the first I-shaped electrode 112, and a second strip extends along a longitudinal edge 111b and the other lateral edge 11c so as to form the second L-shaped electrode 114. An insulating material 120 is also provided between the electrodes and the heating resistive layer 111. Alternatively to the method to apply isolating material the heating alloy can be vaporized with a laser beam. The resulting gap shows the surface of the plastic substrate and is isolating electrodes and heating alloy.

FIG. 11 shows another alternative embodiment, wherein the heating resistive layer 111 is in the form of a U with legs close to one another, the ends 118 and 119 of said legs being located in the immediate vicinity of each other and carrying electrodes 112 and 114, respectively.

Advantageously, the reflective layer is disposed above the heating resistive layer or is formed by the latter.

It goes without saying that the detailed description of the subject matter of the invention, as given by way of illustrations only, is in no way limiting, technical equivalents falling within the scope of the present invention, asl.

The invention claimed is:

1. A rear view mirror, comprising a housing an motor actuator and a reflective element, wherein the reflective element is a plastic material substrate with a first surface coated with at least a reflective layer and a second surface with at least a set of molded fixing elements to be fixed at the motor actuator and with a metal layer as a thermal conductor, said set of molded fixing elements includes molded contact noses for heater contacts.

2. A rear view mirror according to claim 1 wherein the edge radius along the rim of the mirror shape has a value of more than 0.6 mm.

3. A rear view mirror according to claim 1 wherein the plastic material substrate includes a frame area along the rim of the mirror substrate shape with an increased thickness.

4. A rear view mirror according to claim 1 wherein the reflective layer is an Al—Ti layer.

5. A rear view mirror, according to claim 1 wherein the reflective element includes a protection hard coat layer with a first and a second layer of the same hard coat material, the first layer deposited by a dipping process, the second layer applied by a spraying process.

6. A rear view mirror according to claim 5 wherein the first hard coat layer is smooth with a roughness smaller than wavelengths of visible light.

7. A rear view mirror according to claim 1 wherein the second surface is coated with a heating resistive alloy of Ti—Al or Ni—Ti.

* * * * *